Dec. 29, 1970     J. H. LEMELSON     3,550,203
APPARATUS FOR ELECTRICAL CABLE

Filed Jan. 21, 1969     2 Sheets-Sheet 1

INVENTOR.
JEROME H. LEMELSON

INVENTOR.
JEROME H. LEMELSON

United States Patent Office 3,550,203
Patented Dec. 29, 1970

3,550,203
APPARATUS FOR ELECTRICAL CABLE
Jerome H. Lemelson, 85 Rector St.,
Metuchen, N.J. 08840
Continuation-in-part of application Ser. No. 142,405,
Oct. 2, 1961. This application Jan. 21, 1969, Ser.
No. 792,725
Int. Cl. B29f *3/014*
U.S. Cl. 18—13                                                8 Claims

ABSTRACT OF THE DISCLOSURE

This invention relates to an apparatus and method for producing a composite extrusion such as an electrical cable made of continuously fed material such as extruded sodium or other metal, an electrolyte or other fluent conducting material which is contained or encapsulated in a plastic sheaving and to improved structures in the conductors so formed. In one form, solid portions of the filled extrusion separate hollow portions thereof and may be cut through during the fabrication of the cable or after spooling same at the side of its use without spilling or exposing the core conductor. The invention is also concerned with the fabrication of other composite extrusions containing preformed core members and with different means for supporting said core members within the extrusion.

RELATED APPLICATIONS

This is a continuation-in-part of application Ser. No. 142,405, filed Oct. 2, 1961, now Pat. No. 3,422,648, continuation-in-part of parent application Ser. No. 691,622, filed Oct. 22, 1957, now U.S. Pat. Re. 25,570.

SUMMARY OF THE INVENTION

This invention relates to improvements in composite extrusions, apparatus and methods for producing same and in particular to extrusion apparatus for producing electrical cable having core-members surrounded by jacket-portions which are extruded in-situ on and protect said core members. The core members may be preformed or produced by extrusion directly into tubular jacket portions formed thereabout by extrusion. Most insulated electrical wires are produced by feeding a single wire or twisted array of wires through an extrusion die and extrusion coating same with a suitable plastic. Sodium metal has been expressed into jacketing made of plastic but, like the coating of wire, when the cable is cut, the end portions of the sodium core are exposed to the atmosphere and require special handling and jacketing in order to avoid rapid oxidation of the sodium and possible explosion or fire caused, for example, by moisture or water contacting the sodium.

It is accordingly a primary object of this invention to provide a new and improved apparatus and method for producing new and improved composite extrusions such as electrical cable of improved structure.

Another object is to provide an apparatus for producing an electrical cable having a core made of a conducting material which is extruded in situ within a sheaving which is also extruded to shape. Another object is to provide an apparatus for producing a composite extrusion having a core material encapsulated within a sheaving or envelope formed by extrusion and having wall portions which vary in thickness.

Another object is to provide an apparatus for producing an extrusion having portions thereof which are solid and portions which are tubular in shape the tubular portions being separated for each other by the solid portions.

Another object is to provide an apparatus for producing improved electrical conductors comprising sodium metal filling a passageway in a jacketed extrusion having a wall which varies in thickness along its length and includes portions which are solid through and through which serve to block off the portions containing sodium metal and may serve as end wall portions when the conductor is cut through said solid portions.

Another object is to provide new and improved structures in cable conductors which may be produced at relative low cost and may be easily cut to length without exposing the conducting material to the atmosphere. Another object is to provide an improved electrical conductor system and means for joining lengths of the conductors thereof.

Another object is to provide new and improved structures in electrical having a conducting core supported within and separated from a sheaving by portions of the extrusion.

With the above and other objects in view as will herein after more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 1:
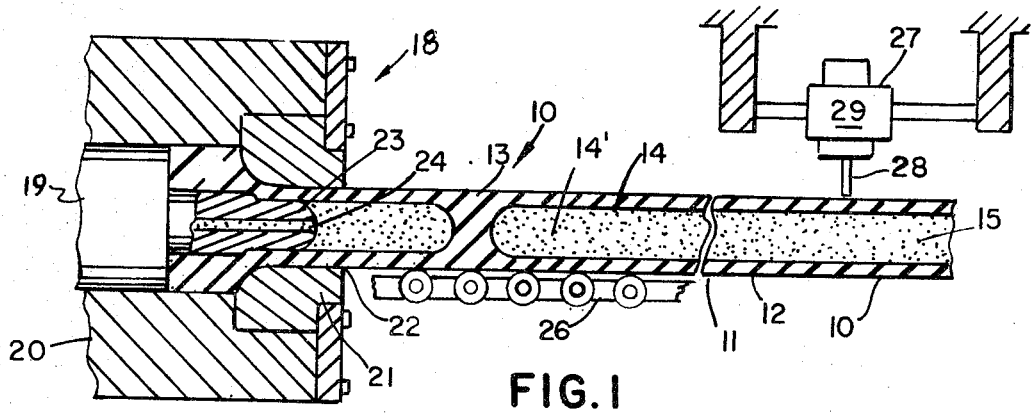
FIG. 1 is a partial side view with parts sectioned for clarity of an extrusion apparatus for producing an electrical conductor forming part of the instant invention.

There is shown in FIG. 1 a section 11 of electrically conducting cable 10 made by extrusion in accordance with the teachings of copending patent application Ser. No. 152,405. Said application discloses an extrusion apparatus including an extrusion chamber 20 capable of producing an elongated tubular member having solid through and through portions of the length of said extrusion which are formed therein by extrusion and serve to separate volumes or passageways within the extrusion from one another. The tubular wall 12 and solid portions 13 of the extrusion are made of an insulating plastic and define the side and end walls of a sheaving for sections of electrical conductors formed of conducting material filling the volumes 14 defined by said wall and solid portions. The tubular wall 12 which is shown in FIG. 1 as cylindrical in external shape, is formed by expressing suitable polymeric material such as polyethylene, polypropylene, polyurethane, synthetic rubber of other flexible plastic through an opening 22 in a die 21 containing a mandrel 23 shaped to define the inside surface of said wall. By properly shaping and providing mandrel 23 axially movable within the die opening, as provided in said copending application, the inside diameter of the extrusion may be varied and a solid through and through portion such as 13 may be formed by retracting the mandrel a sufficient degree into the die opening to permit material being expressed to form a solid extrusion. In said copending application, means are also provided for introducing a fluent material through a passageway 24 in the mandrel into the volume 14 defined by the cylindrical wall 12 of the extrusion, and for program controlling the flow of said fluent material in accordance with the movement of the mandrel so as to substantially fill said volume with such fluent material, and also in accordance with the program controlled flow of the extrusion material forming the extrusion 12 and portions 14.

By predeterminately timing and controlling mandrel movement and position together with control of flow of said fluent materials, as described in my said copending application, the lengths and longitudinal locations of the solid portions 13 of the extrusion 11 may be determined with each length filled with a suitable electrical conducting material to provide conducting electrical cable sections of predetermined lengths. Thereafter, individual cable sections may be provided by cutting through the solid portions 13 to sever the lengths of the filled extrusion between said solid portions from each other. A cutting apparatus 27 includes a circular saw 28 having a blade 28' and mounted on a carriage 29 which is power operated to reciprocally travel along a track parallel to the extrusion at the same speed thereof to permit the blade to cut through the extrusion solid section 13 without interfering with the travel of the extrusion.

The extrusion 10 is received by and conveyed along a powered conveyor 26 away from the extruder. An automatic cutting device 27 in the form of a powered flying shear or saw having a blade 28 is predeterminately controlled to advance against and sever the solid portions 13 of the extrusion between the tubular portions 12 thereof. A single program controller may be employed to predeterminately control extrusion rate, mandrel movement, flow of material filling the hollow portions of the extrusion and operaiton of the means for cutting the extrusion along the solid sections 13 thereof.

In a preferred form of the invention, the material 15 filling the volumes 14 within the extrusion comprises a conductor 15 such as sodium metal although various other metals, semi-conducting materials, conducting polymers, salts or electrolytes may be introduced through the mandrel to fill the volumes 14 and serve to conduct the electricity along the length of the cable.

Figures 2, 4:
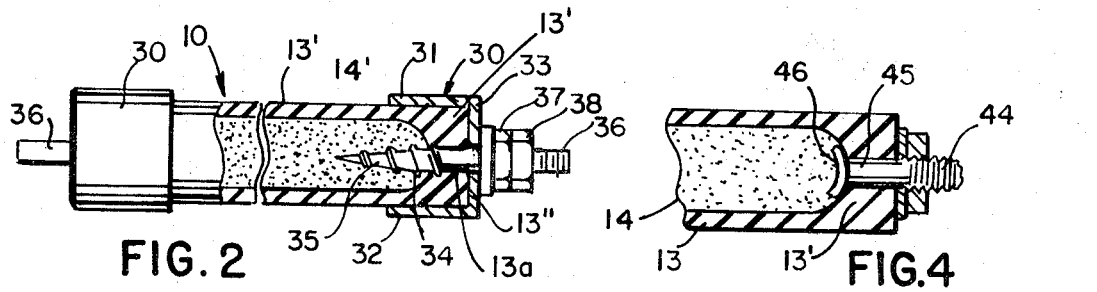
FIG. 2 is a sectioned view of a segment of a conductor made by means of the apparatus of FIG. 1 and an electrical connector therefore.
FIG. 4 is a section view of an electrical conductor formed by the apparatus of FIG. 1 and another form of connection means.

After the sections of conducting cable have been cut to length, connection fittings may be secured to both ends of the cable sections so formed, preferably by longitudinally penetrating the solid portions at each end of the cable to make electrical contact of the fitting with the conducting material within the cable. In FIG. 2 is shown a fitting 30 secured to an end of the cable 10 and having a cup-like formation 31 with a cylindrical side wall 32 circumscribing the end portion of the extrusion and fastened securely thereto by bonding and/or frictional engagement therewith. An end-wall 33 of the fitting extends across the cylindrical side wall 32 and is shown in abutment with the end face 13'' of the severed portion 13' of the solid formation of the extrusoin. Axially secured to the end wall 33 is a contact pin 34 which passes through an opening 13a in or penetrates the solid end portion 13' of the sheaving. The pin 34 is shown having a helical thread or corkscrew-like formation 35 provided along its shank which serves to threadably secure the fitting to both the end-wall 13' of the sheaving 11 and the conductor 15 held therein. The contact pin 34 extends completely through the wall 33 of cup-like member 31 and is preferably welded thereto to hermetically seal same thereto. An extension 36 of pin 34 protrudes outwardly from the outer face of wall 33 of member 31 and is threaded or otherwise formed to permit secured thereto one or more wires, electrical connectors or terminals of electrical devices. In FIG. 2, the upper shank or extension 36 of pin 34 is threaded to receive a plurality of metal nuts 37, 38 for securing a wire or lug secured to a conductor or for electrically connecting a plurality of conductors such as the cables 10 to form a line or network thereof.

Fitting 30 may be secured to the end of cable section 11 in a number of manners. In one technique, the pin 34 may be shaped to define a helix or tapered spiral formation 35 as illustrated, thereof with the free end of said spiral formation being sharp edged or pointed permitting it to puncture the penetrating wall formation 13' and pass therethrough by rotating the fitting 30 into the sodium conductor 26 fitting the volume 14. Continued rotation of the fitting 30 causes the spirally formed pin shank to wind its way into the solid conductor 15, such action being continued until the inside face of fitting end wall 33 egnages the end face of the cable as illustrated. To further retain the fitting in place and effect the hermetic sealing thereof with the wall 12 of the cable to assure the sealing off of the opening in the end wall portion 13' of the cable, through which the spiral pin 34 passes, the cylindrical wall 32 of the fitting may be made smaller in inside diameter than the outside diameter of cable 12 so as to forcibly compress said cable therein during the described assembly operation or may be crimped or otherwise reduced in diameter to compress the cable therein after the pin formation is fully inserted as illustrated.

An adhesive or sealant may be disposed on the inside surface of fitting formation 31 and/or the exterior surface of the end of the cable 11 prior to the assembly of the two and utilized to effect or enhance the sealing of the fitting and cable. Or, if the cup-like formation 31 is a heat weldable material such as a polymer, it may be fusion or friction welded to the end of the cable.

In modified forms of the embodiment of the invention illustrated in FIG. 2 modifications may be made to the end fitting 30 and may include the provision of an O-ring seal of suitable flexible material around the pin 34 and operative to be compressed between fitting end wall 33 and the end surface of the wall 13' of the cable so as to effect a hermetic or fluid seal across the opening in wall 13' and the surface of pin 34 when so compressed. The inside surface of cylindrical wall 32 of the fitting may be threaded to permit the fitting to threadably cut or bite the material of the side wall of the cable during the described assembly operation to enhance the gripping action or effect retention of the fitting 30 to the end of the cable.

Insertion of the contact pin portion 34 into the volume 14 so as to make electrical contact with conducting material disposed therein may also be effected by providing an opening through wall 13' during or after the extrusion thereof. The end of the extrusion mandrel, for example, may be shaped with a reduced diameter portion to effect the provision of a passageway through wall 13' which is preferably smaller in diameter than the mean diameter or minimum diameter of the shank of the pin portion 34 which may taper along its length to the end thereof. A small hole through wall 13' to facilitate assembly of the pin therewith may also be provided by drilling. In still another technique, pin portion 34 of the connector may be heated by any suitable means to soften or melt the material of the cable as it is inserted therein. Or, the pin portion 13' may be threaded and conically shaped at its end to permit it to tap and/or cut its own hole through end wall 13' of the cable as it is rotatably forced therethrough.

The pin portion 34 of the connector may also have a straight or tapered shank without being helically threaded or formed and may be forced through an opening in fitting end wall 33 after the fitting 30 has been fastened to the end of the cable by one or more of the techniques described. The frictional fit and retention of the pin 34 by the end wall 33 and the wall portion 13' will securely hold said pin in place and will prevent back spew or leakage of the conductive material 15 from between the end wall 33 and the pin. If the side wall 33 of the fitting is shaped, spun or crimped or otherwise inwardly deformed to compress the cable wall and form a fluid pressure seal, any conductive material which flows into the interfacial volume between the inside surface of cup-like formation 31 and the exterior surfaces at the end of the cable will be confined thereto and will not leak or be exposed to the atmosphere.

Figures 3, 5:
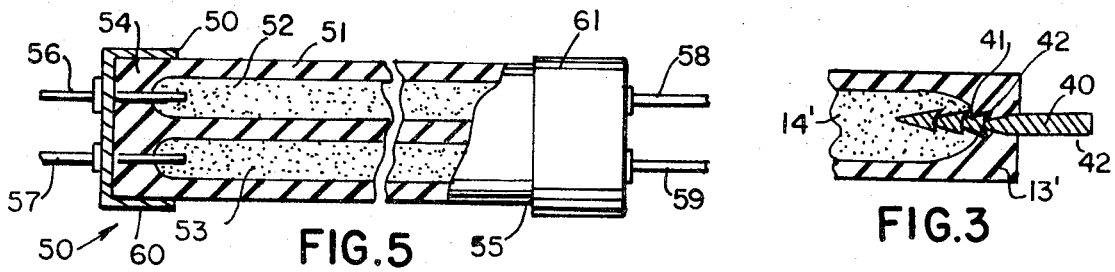
FIG. 3 is a section view of a fragment of a conductor formed by the apparatus of FIG. 1 and another form of electrical connector.
FIG. 5 shows a multiple conductor cable formed by a modified form of the apparatus of FIG. 1 and connection means therefore.

FIG. 3 illustrates a modified form of connection means for a conducting line or cable of the type described. The connector 40 is in the shape of a pin having a shank with a serrated end-portion 41 with a plurality of tandemly arrayed formations 42 extending outwardly and having conical surfaces which taper inwardly towards the nose of the shank so as to permit said pin to be retained in the end wall 13' when forced through a smaller axial hole therethrough. The other end 42 of the connector pin 40 is threaded to receive one or more connection nuts for connecting another conductor or terminal thereto or may be otherwise shaped such as with a lug or receptacle portion to effect a desired electrical connection therewith. The end of the serrated shank portion 41 is shown penetrating the conducting material 15 and embedded therein.

In FIG. 4 is shown a modified form of connection means for a filled conducting cable of the type hereinabove described. The connector 44 comprises a hollow copper tubular member 45 one end 46 of which is shown extending into the conductor 15 near the wall 13'. The end of member 45 is upset against the inside surface thereof so as to prevent its removal through the hole 13a in the end wall 13' through which member 45 passes. Assembling the connector 44 with the cable may be effected by explosively upsetting said end 46 of said tubular member or drawing an expander pin therethrough from the other end of the tubular member.

FIG. 5 shows a further embodiment 50 of the invention in the form of an extruded cable 51 having a plurality of parallel passageways 52, 53 formed therein and closed off at their ends by extrusion by use of a modified form of mandrel shaping means of the type described. Penetrating both end wall portions 54, 55 of the multiple passageway containing extrusion 51 are a plurality of connectors 56, 57 at one end of the conductor and 58, 59 at the other end thereof. The connectors at each end of the cable are insulatedly mounted on respective cup-like fittings 60 and 61 secured to the cable 51 as hereinbefore described. A plurality of additional sodium or liquid electrolyte containing passageways and end connection means may thus be provided in a cylindrically shaped extrusion, a flat ribbon-like cable extrusion or one of any suitable shape.

Figure 6:
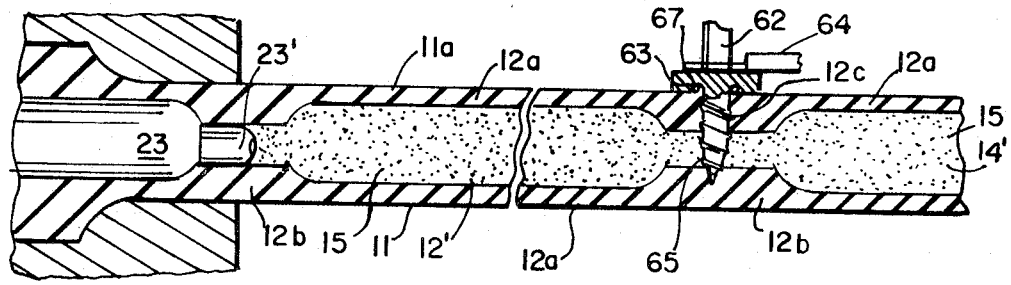
FIG. 6 shows a modified form of the apparatus of FIG. 1 and connection means for the conductor formed therewith.

Connection of branch conductors to the cable described may be effected therethrough the side wall thereof by penetration of said side wall with a suitable electrical connector terminating a wire, electrical device or similar cable conductor. In FIG. 6 a portion 11a of electrical cable 11 produced as described but having a wall 12' comprising first portions 12a extending along most of the length of the cable and one or more portions 12b of short length and of greater wall thickness than the portions 12a to provide more material to receive and support the electrical connector 62. The portions 12b may be produced by predeterminately retracting the extrusion mandrel 23 to increase the inside diameter of the wall 12 of the extrusion while controlling the longitudinal movement of a hollow pin 23' extending through the center of the mandrel to advance same with respect to the mandrel and prevent formation of a solid extrusion as at portions 13 which form the end walls of the cable lengths. In FIG. 6 conducting material 15 is predeterminately controlled in flow through the passageway in pin 23' by the described programming means to inject just the amount of sodium, electrolyte or other conductor into the cable needed to fill same.

In FIG. 6 the radial connector 62 includes a head 63 having an undersurface contoured to the exterior shape of the cable so as to be smoothly compressible thereagainst. A clamping strap or ring is drawn and fastened around the cable and retains head 63 against the cable wall while a conducting pin 65, extending from the head 62, passes through a radial opening 12c drilled or otherwise provided in wall portion 12b of the cable and penetrates conducting material 15 filling same so as to electrically connect an electrical receptacle 64, connected to pin 63, to the conductor within the cable. An O-ring 67 under the head 63 around pin 65 may be employed to hermetically seal the opening 12c although the head 63 may be sealed or bonded to the cable surface.

A master computer or program control device of the type provided in application Ser. No. 142,405 deriving sequential command control signals from a record card or magnetic tape may be employed to control the variable components of the extrusion apparatus 18 of FIG. 1 such as the timing and rate of travel of the extrusion material prime mover or piston 19, the means for advancing and retracting the mandrel 23 to vary the shape of the die opening and the means for varying, initiating or terminating the flow of filler material 15 through the mandrel into the center or core portions of the extrusion so as to properly effect the production of the extrusions shown in FIGS. 1–6 or modifications thereof. In certain instances it may be desirable to extrude materials other than those polymers mentioned such as ceramics or metals into tubular extrusions and to fill the tubular extrusions with other materials such as oil, inert or conducting gas, conducting or nonconducting polymers, etc.

Figure 7:
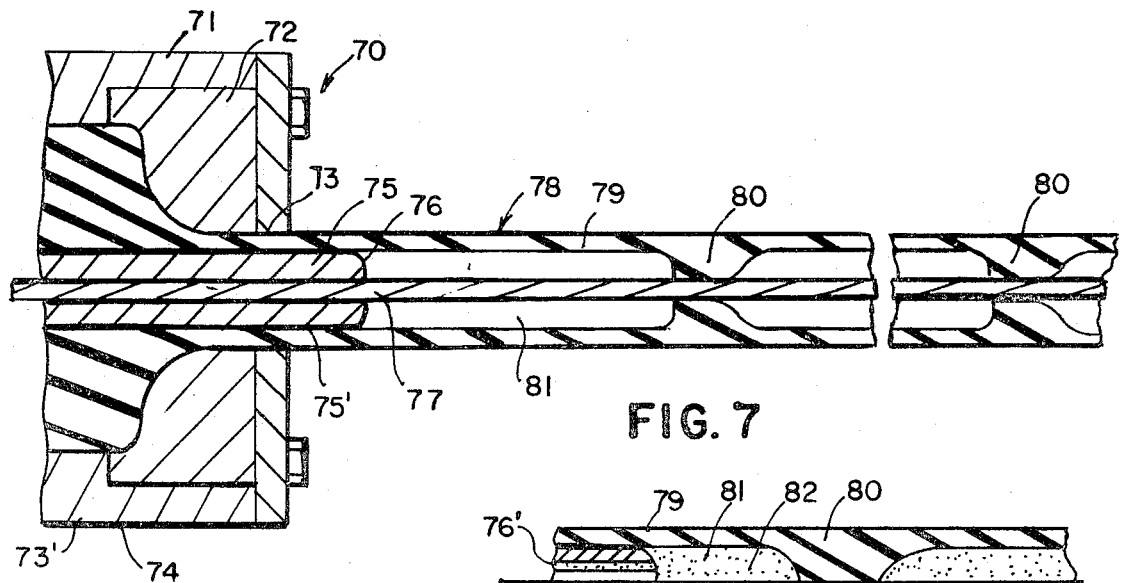
FIG. 7 is a cross sectional side view of an extrusion apparatus for producing a modified form of electrical conductor.
Figure 8:
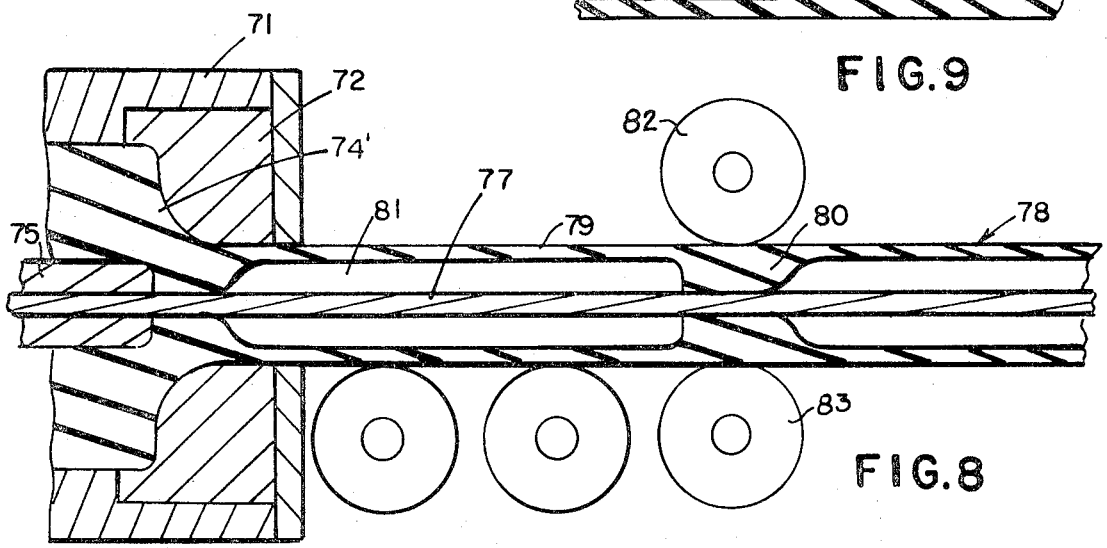
FIG. 8 is a cross sectional side view of the apparatus of FIG. 7 in a different mode of operation.

FIGS. 7 and 8 illustrate a modified form of extrusion apparatus for forming an electrically conducting cable. The apparatus 70 comprises an extrusion machine 71 of the type described and including a die 72 secured to and defining the end of an extrusion chamber 74. Protruding into the opening 73 of the die 72 and longitudinally movable therethrough as described is a mandrel 75, which when in the position illustrated in FIG. 7 is operative to define the inside wall of the tubular section 79 of an extrusion 78 by the flow of extrusion material over the outside surface 75' of the mandrel. When the mandrel 75 is retracted as shown in FIG. 8, a solid extrusion may be formed within the opening 73 of die 72 so as to provide an elongated extrusion, as illustrated, having tubular portions 79 extending along the major length of the extrusion and separated by portions 80 of greater wall thickness.

A passageway 76 extends through the mandrel 75 through which passageway a wire or cable 77 is automatically fed at substantially the rate or velocity at which the extrusion 78 is formed. By program controlling the longitudinal movement of the mandrel 75 to cause it to project into the die opening as shown in FIG. 7 during predetermined time intervals in an extrusion cycle and to retract therefrom as shown in FIG. 8, an elongated tubular extrusion may be formed having annular wall portions 79 completely surrounding the cable or wire 77 and spaced therefrom to provide annular volumes 81 separated by portions 80 of the extrusion which extend to and support the core member 77 centrally within the extrusion as shown. In other words, for short intervals during which the mandrel 75 is retracted, the wall thickness of the extrusion is increased so as to cause the flow of extrusion material inwardly against the surface of the member 77 as shown in both figures. The wire 77 secured in the portions 80 of the extrusion is drawn thru the mandrel 75 by powered rollers 82 and 83 engaging opposite faces of the extrusion and driving same away from the extruder 71. The wire or cable 77 is thus separated by annular volumes 81 which may contain air, an inert gas, filler insulating material such as foamed plastic or other insulating material including, in certain instances, oil. The material disposed within the annular volumes 81 will depend upon the desired characteristics of the cable or wire assembly 78 including the voltage at which it is to be used, rigidity requirements, etc.

Figure 9:
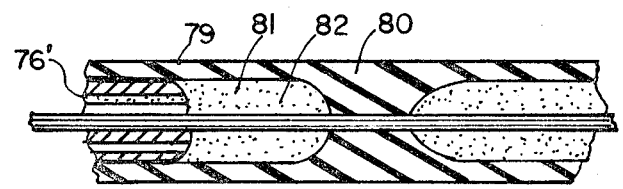
FIG. 9 is a side view in cross section of a modified form of the electrical cable shown in FIGS. 7 and 8 and the apparatus for producing same.

The volumes 81 mya also be filled with an electrically conducting material such as the described sodium or potassium metals and the filler material may be provided within said volumes by injecting same through one or more additional passageways extending longitudinally through the mandrel 75 as shown in FIG. 9. These passageways are referred to by notation 76' and extend from a supply of the filler material 82 such as an auxiliary extrusion screw, pump or valve which, together with the prime moving means for forcing extrusion material through the extrusion chamber 74' and the means for longitudinally moving the mandrel 75 through the extrusion die, may be program controlled in operation by a single master controller or programming apparatus of the type defined in said parent applications and operative to feed the proper amount of filler material to completely fill the volumes 81 between the solid portions 80 of the extrusion wall which separates said annular volumes 81. A plurality of passageways 76' may be concentrically provided through the mandrel 75, each extending from a source of filler material. The filler material 82 may also comprise a self-foaming polymer which is operative to expand in situ within the volumes 81 after being injected therein in the proper quantities so as to form cellular, insulating plastic completely surrounding the core wire or cable 77 as shown in FIG. 9.

The core member 77 may comprise a single metal wire, group of wires or filaments or a material extrusion formed to shape as fed through the passageway in the mandrel 75. If the filler material 82 is a conductor such as the described extrusion formed sodium or potassium metal, the core member 77 may be utilized primarily to substantially enhance the tensile strength of the cable, although it may also be used as a conductor and, accordingly, may comprise steel rod or cable, high-strength copper or other material. If sections of the cable are severed along the portions 80 thereof, the wire 77 may also be utilized as a means for electrically and mechanically connecting sections of cable together by fastening or welding fittings or other wires to the end portions of the core wire 77 which may be bared by removing some of the plastic material remaining of the severed portions at the ends of said sections of cable.

The core member 77 may also comprise a wire rope, another electrical cable having a sheathing and a plurality of internal wires contacting or electrically insulated from each other by plastic, an extrusion of material substantially greater in tensile strength than that comprising the outer sheathing 78, a tubular member made of metal, plastic or combinations of these materials for conducting a gas or liquid centrally through the cable or other suitable elongated member which is preformed or formed as it is fed to the extrusion machine 71 and the passageway 76 in the mandrel 75.

It is to be noted that the techniques and apparatus hereinbefore described for forming elongated tubular extrusions and filling portions of same with fluent materials, may be utilized for forming containers filled with liquids or powder contents. If the wall thickness of the outer extrusion is substantially reduced, bag-like containers or can-like containers may be continuously and automatically extruded, filled with contents and end sealed by mandrel movement as described.

Figures 10, 11, 12:
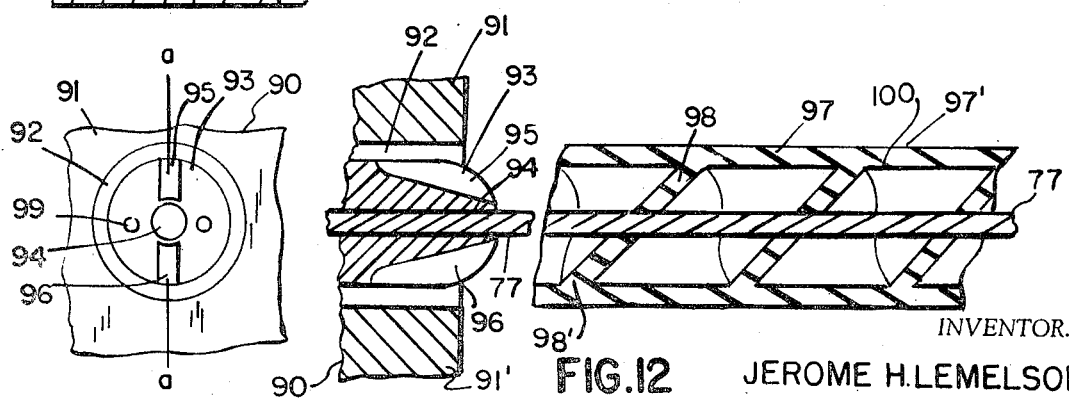
FIG. 10 is an end view of part of an extrusion apparatus which is a modified form of the apparatus of FIGS. 7 and 8.
FIG. 11 is a side view in cross section of FIG. 10.
FIG. 12 is a side view in cross section of a fragment of an electrical cable produced by means of the apparatus of FIGS. 10 and 11.

In FIGS. 10 and 11 is shown an apparatus 90 for producing a modified form of the described jacketed cable. The apparatus 90 includes an extruder 91 having an extrusion die 91' at one end thereof with an opening 92 defined as annular in shape by means of a mandrel 93 extending through said opening. Respective diametrically opposed channels or grooves 95 and 96 are formed in the end of the mandrel 93 and extend almost to the end of the passageway 94 extending through the mandrel 93. The channels 95 and 96 permit extrusion material to flow and form respective land-like formations extending from the annular jacket portion 97' of the extrusion 97 to the outer surface of the cable 77 fed through the passageway 94 in the mandrel so as to form respective fin-like portions of the extrusion supporting the cable or wire in the center of the extrusion. The fin-like portions 98 and 98' of the extrusion may extend radially in the same or different planes along the length of the extrusion. If the mandrel 93 is supported within the die and is power operated to rotate at constant speed as extrusion occurs, the land-like formations 98 and 98' may be twisted into respective helical formations extending along the length of the extrusion thereby affording support for the cable 77 in a more uniform manner peripherally around the extrusion. The rotation of the mandrel will thus provide spiralling formations 98 and 98' as well as a spiral passageway 100 extending through the center of the extrusion which passageway may be filled with foamed plastic, oil, an electrolyte or sodium metal or other suitable material, by injection of said material through passageways 99 extending through the mandrel 93 an terminating at the end thereof as shown in FIG. 10. Thus, a plurality of new types of electrical conductors and cables may be produced by means of the apparatus shown in FIGS. 10 and 11 wherein the flow of extrudate, rotation of the mandrel and, where applicable, the flow of filler material are automatically controlled and preferably maintained constant during an extrusion operation.

In other forms of the invention, the material of which the sheaving or cable 12 is made may comprise a ceramic or high temperature polymer and the conducting material encapsulated therein may comprise sodium, copper, aluminum or other metal which is extruded in situ within the sheaving as the sheaving is extrusion formed as described, cast in situ therein after being introduced thru a mandrel or disposed therein in powdered shape and heated to a molten condition thereafter or sintered to form a solid core conductor.

I claim:

1. Apparatus for fabricating composite extrusions comprising in combination:
(a) an extrusion means having an extrusion die with an opening therethrough for defining the shape of an extrusion,
(b) a mandrel disposed in said die opening,
(c) a passageway through said mandrel,
(d) means for expressing a first material through said die opening and over said mandrel to define a tubular sheathing,
(e) means for delivering a second material through said passageway in said mandrel into the interior of said extruding tubular sheathing, and
(f) means to move the mandrel longitudinally within the die opening during the extrusion to reduce the inside diameter of the tubular sheathing to substantially close the sheathing at spaced intervals along the length of the composite extrusion.

2. Apparatus for fabricating composite extrusions comprising in combination:
(a) an extrusion means having an extrusion die with an opening therethrough for defining the shape of an extrusion,
(b) a mandrel disposed in said die opening,
(c) a passageway through said mandrel,
(d) means for expressing a first material through said die opening and over said mandrel to define a tubular sheathing, (e) means for delivering a second material through said passageway in said mandrel into the interior of said extruding tubular sheathing, and (f) means for predeterminately varying the cross section of said first material formed in said die during an extrusion cycle to provide a composite sheathing for said material which varies in the shape along the length of said sheathing, whereby said first material comprises an electrically insulating material and said second material comprises an electrical conducting material expressed from said mandrel to substantially fill the interior of said sheathing.

3. Apparatus in accordance with claim 2, whereby said means for predeterminately varying the cross section of said sheathing comprises means for relatively moving said mandrel and said die to vary the cross sectional area of the die throat in which material is formed to shape and means for operating said moving means in a predetermined manner during an extrusion cycle.

4. Apparatus in accordance with claim 3, including means for predeterminately varying the flow of said second material during an extrusion cycle in accordance with variations in the cross sectional area of the interior of said sheathing so as to maintain the interior of said sheaving substantially filled with said second material.

5. Apparatus in accordance with claim 3, said means for varying the cross section of said sheathing being operative to provide a tubular first portion of said extrusion defining the major length of said sheaving and to provide a plurality of second wall portions of said extrusion at predetermined locations along the length thereof which are of substantially greater thickness than the wall thickness of said tubular portion and means operative as extrusion progresses for cutting through at least certain of said second portions of said extrusion to sever predetermined lengths of the extrusion each containing a quantity of said second material held within the severed portion by said second wall portions.

6. Apparatus in accordance with claim 5, including means for automatically inserting electrical connectors into said sheathing at predetermined locations thereof after the extrusion is formed.

7. Apparatus in accordance with claim 1, said passageway in said mandrel extending longitudinally through said mandrel and being substantially constant in cross section and an elongated wire or cable extending through said passageway, means for feeding said wire through the center of the extrusion formed in said die, the means for varying the cross section of said first material being operative to provide spaced apart portions of the extrusion extending to an engaging portions of said wire and other portions of said second material concentric with and spaced apart from said wire.

8. Apparatus in accordance with claim 1 including means for rotating said mandrel within said die, said mandrel being shaped to provide spiral-like formations in the inside wall of said tubular extrusion.

References Cited

UNITED STATES PATENTS

| | | | |
|---|---|---|---|
| 833,290 | 10/1906 | Betts | (174 Sodium) UX |
| 2,583,329 | 1/1952 | Eckert | 18—14 |
| 2,583,330 | 1/1952 | Eckert | 18—14 |
| 2,750,625 | 6/1956 | Colombo. | |

H. A. KILBY, JR. Primary Examiner

U.S. Cl. X.R.

174—77; 18—12